United States Patent [19]

Nakamura

[11] Patent Number: 5,231,514
[45] Date of Patent: Jul. 27, 1993

[54] IMAGE DATA PROCESSING DEVICE

[75] Inventor: Kenji Nakamura, Takatsuki, Japan

[73] Assignee: Minolta Camera Kabushiki Kaisha, Osaka, Japan

[21] Appl. No.: 648,550

[22] Filed: Jan. 31, 1991

[30] Foreign Application Priority Data

Feb. 5, 1990 [JP] Japan ................................ 2-25717
Feb. 20, 1990 [JP] Japan ................................ 2-40556

[51] Int. Cl.⁵ .............................................. H04N 1/40
[52] U.S. Cl. ................................... 358/444; 358/404
[58] Field of Search ............... 358/444, 404; 395/164, 395/165, 166; 369/110, 112

[56] References Cited

U.S. PATENT DOCUMENTS

| | | | |
|---|---|---|---|
| 4,078,249 | 3/1978 | Lelke et al. | 395/164 |
| 4,591,997 | 5/1986 | Grabel | 358/444 |
| 4,719,516 | 1/1988 | Nagashima | 358/444 |
| 4,934,823 | 6/1990 | Okami | 395/164 |
| 5,068,745 | 11/1991 | Shimura | 358/403 |

FOREIGN PATENT DOCUMENTS

| | | |
|---|---|---|
| 63-171063 | 7/1988 | Japan . |
| 63-171064 | 7/1988 | Japan . |
| 1-165267 | 6/1989 | Japan . |
| 1-185078 | 7/1989 | Japan . |
| 1-243686 | 9/1989 | Japan . |

Primary Examiner—Edward L. Coles, Sr.
Assistant Examiner—Thomas Stoll
Attorney, Agent, or Firm—Willian Brinks Olds Hofer Gilson & Lione

[57] ABSTRACT

An image data processing device includes a first memory having a plurality of memory blocks for storing image data, a designator for designating an image data to be erased, an evacuator for temporarily evacuating image data other than the designated image data from a sharing memory block in which at least a part of the designated image data is stored, an erasure for erasing the designated image data from the memory block, and a controller for causing the temporarily evacuated image data and a new image data to restore in an emptied memory position.

24 Claims, 8 Drawing Sheets

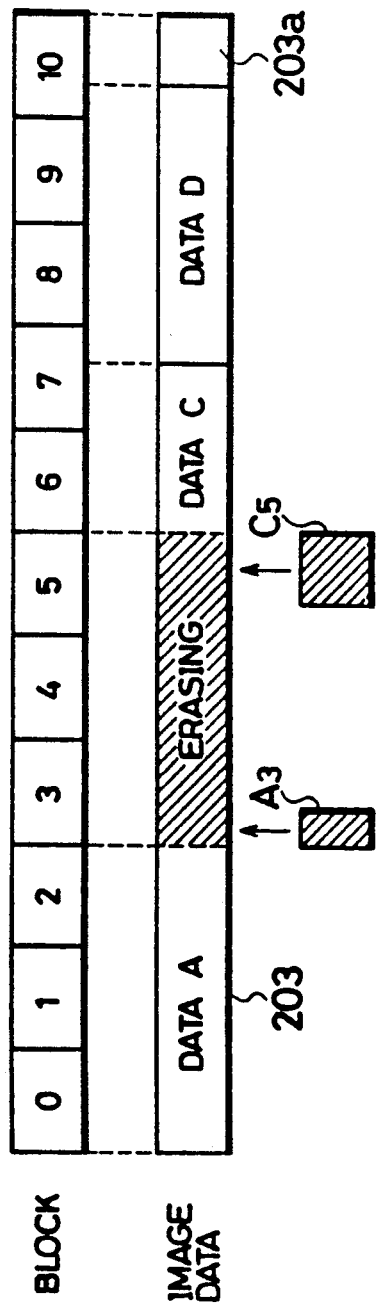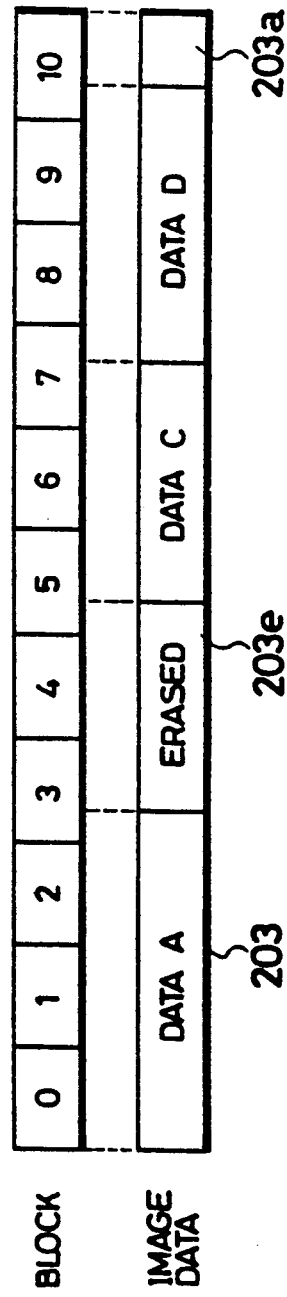
FIG. 8
FIG. 9

IMAGE DATA PROCESSING DEVICE

BACKGROUND OF THE INVENTION AND PRIOR ART STATEMENT

The present invention relates to an image data processing device in which an image data is compressed and stored in a memory.

As an image data processing device, there has been known an electronic still camera in which a photographed still image is converted to a digital image signal in a two-dimensional photoelectric conversion element, the digital image signal being then processed and recorded in a memory. The recorded still image is reproduced on a TV screen.

Such electronic still cameras have been attracting public attention for a reason that these cameras change a photographed image into a digital signal which can be applied for wider variety of devices than conventional film camera, consequently promising future developments.

As a memory for storing a digital image signal, there have been proposed a magnetic sheet in the form of a disk and a memory card carrying a solid-state memory. However, a magnetic sheet has not been considered to be preferable to actually use as a memory for an electronic still camera due to the fact that to record image signals on a magnetic sheet, the position of recording head and the rotation of magnetic disk are required to control with very high precision, which consequently makes it impossible to give an electronic still camera high portability and durability and with low cost which are usually needed for cameras.

It has been seen that a memory card carrying a solid-state memory has advantages of requiring a smaller number of mechanical parts to record image signals, and of reducing the size and weight. However, a solid-state memory carried in a memory card has a small storage capacity. Accordingly, greater number of solid-state memories are required to store greater number of image signals, which results in higher cost.

To overcome this drawback, signal compression has been proposed in which an image signal is compressed and stored in a memory, and expanded when reproducing. This signal compression makes it possible to store a greater number of image signals in a limited storage capacity.

In view of storage capacities of presently available solid-state memories, however, it is necessary to compress a image signal at a considerably high ratio. For example, to store a digital signal produced by digitizing one field of image signal at a sampling frequency three times as much as chrominance subcarrier frequency, a storage capacity of about 1.5 mega bits is required. Accordingly, in the standard case of storing digital signals for 50 fields in one memory medium, the memory medium is required to have a capacity of 75 mega bits.

In signal compression, there are two ways. One is a reversible compression which involves no reduction of the amount of information. The other is an irreversible compression which involves reduction of the amount of information. The reversible compression has a maximum compression ration of $\frac{1}{3}$, and accordingly requires a memory having a capacity of 25 mega bits to store 50 fields. If used static RAMs (hereinafter called SRAM), it is necessary to use 25 SRAMs to store 50 fields. This is undesirable in aspects of size and cost. On the other hand, the irreversible compression has a maximum compression ration of 1/10. Accordingly, it is sufficient to use 8 SRAMs to store 50 fields. This is desirable in commercial aspect. The irreversible compression is accomplished by using differential pulse-code modulation (DPCM), or discrete cosign transformation (DCT), for example.

However, when an image signal is compressed at a high compression ratio, the quality of the image deteriorates. In other words, a processed image becomes considerably different from the original photographed image. When signal compression is carried out using the above-mentioned DCT in which less number of bits are allocated to high frequency components of the image signal than to the other frequency components, most high frequency components of the image signal are lost through the compression-expansion process, making a reproduced image as a whole blur.

Japanese Unexamined Patent Publication No. 63-286078, for example, discloses an electronic still camera having two recording modes. One is a compression mode in which an image signal is recorded after being compressed. The other is a non-compression mode in which an image signal is recorded without being compressed. The photographer can select one of the two modes to obtain image quality and storage capacity suitable for his photographic purpose. In this camera, also, the selected mode for each photography is recorded on a memory, and reproduction is performed in accordance with the recorded mode selection. This camera employs a signal compression in which an image signal is compressed by thinning picture element signals. Accordingly, all the portions of one picture are reproduced at the same definition, or the same compression ratio. Therefore, this camera have the above-mentioned problem that the reproduced image is out of focus as a whole.

Japanese Unexamined Patent Publication No. 63-299680 discloses a method of digitizing a photographed image signal in which a background portion and a non-background portion of the subject view are discriminated based on the difference between the highest luminance and the lowest luminance in each portion, and image signals corresponding to their respective portions are digitized at different bits. However, it should be noted that in this method, compression ratio is not controlled in accordance with focussing condition. Also, it could be seen that this method needs a complicated circuit for discriminating a background portion and a non-background portions.

Also, there have been proposed devices for erasing image data stored in a solid-state memory. For example, Japanese Unexamined Patent Publication No. 1-185078 discloses an electronic still camera in which a desired image data in a memory card can be erased in accordance with address, and the remaining image data are succeedingly transferred toward the portion which has been emptied by the erasure so that a new emptied portion is produced in a last portion of the memory area.

Japanese Unexamined Patent Publication No. 1-243686 discloses a method for erasing an image data. This erasure method is employed for an electronic still camera carrying a memory card including SRAMs. In this erasure method, when a new image data is stored in the memory card, the new image data is stored over an appropriate old image data already record on the memory card by rewriting administrative data for the old image data. In other words, the old image data is not erased before recording the new image data. Specifically, the memory includes a great number of memory bits which are divided into a number of blocks every a predetermined number of memory bits. An image data is stored by using a plurality of blocks. Administrative data, such as the number of blocks which are used to store each image data, and the serial number or name of the used blocks for each image data, is recorded in a specified memory area. When a particular image data to be erased is instructed, only the administrative data for the particular image data is erased, the particular image data itself is erased when a new image data is written over the particular image data.

Japanese Unexamined Patent Publication No. 1-165267 discloses an electronic still camera in which a photographed image data is recorded in a volatile memory, such as RAM, and displayed in the viewfinder of the camera to enable the photographer to confirm the photographed image before recording it in a memory card.

As mentioned earlier, a solid-state memory provided in a memory card does not have a large storage capacity. For this reason, digitized image data is compressed and stored to utilize a limited storage capacity of the memory card at its maximum.

In recent years, there have been produced memory chips having relatively large storage capacity. Also, it has been proposed a memory card comprising a flash EEPROM (e.g., shown in a Japanese Magazine "Nikkei Electronics" Apr. 4, 1988) which does not require a back-up power supply in order to store image data, instead of the aforementioned SRAM and the like.

However, although a flash EEPROM has an increased storage capacity of the memory card, it is known that data stored in a EEPROM cannot be erased but in the lump or in several kilo bits. There could be seen to be a possibility that the capacity of a memory area holding an image data does not correspond to the capacity of an erasing unit of blocks. Accordingly, it is very difficult to erase one of adjoining two image data a front portion of one and a rear portion of the other of which are recorded in a common block. On the other hand, in the case of recording image data in a specified erasing unit of blocks regardless of the amount of image data to facilitate erasing, the storage capacity cannot be utilized at its maximum.

For such memory means as the aforementioned EEPROM in which image data cannot be erased but in a unit of blocks, accordingly, there has been desired data erasure means which enable recorded image data to be erased in a unit of one picture with assuring the utilization of storage capacity at its maximum.

The data erasure means of the above-mentioned Japanese Unexamined Patent Publication No.1-185078 is useful for a memory in which a desired image data stored in the memory can be erased by designating the address of the desired image data. However, this erasure means is not useful for a memory in which image data cannot be erased but in a unit of blocks, and cannot provide the desired erasure means of enabling image data to be erased in a unit of one picture with assuring the utilization of storage capacity at its maximum.

Also, in the image data erasure means of the above-mentioned Japanese Unexamined Patent Publication No. 1-243686, when erasing a specified image data, only administrative data for the specified image data is erased, but the specified image data itself is not erased. Accordingly, this data erasure means is impossible to employ for a flash EEPROM in which an old image data is necessary to erase before recording a new image data. Therefore, this data erasure means cannot provide the desired erasure means of enabling image data to be erased in a unit of one picture with assuring the utilization of storage capacity at its maximum.

The electronic still camera disclosed in the aforementioned Japanese Unexamined Patent Publication No. 1-165267 enables an photographer to monitor a photographed image in the viewfinder and record only the image he wants to record in the memory card. However, this camera is not provided with data erasure means for utilizing the storage capacity at its maximum by erasing already stored image data.

Accordingly, it is an object of the present invention to provide an image data processing device which has overcome the above-mentioned drawbacks.

It is another object of the present invention to provide an image data processing device which makes it possible to store image data at a maximized utilization of storage capacity of a memory without involving a reduction of the quality of image.

Also, it is another object of the present invention to provide an image data processing device which makes it possible to erase image data stored in different compression ratios every one picture.

SUMMARY OF THE INVENTION

An image data processing device of the present invention comprises first memory means having a plurality of memory blocks for storing image data, designation means for designating an image data to be erased, evacuation means for temporarily evacuating image data other than the designated image data from a sharing memory block in which at least a part of the designated image data is stored, erasure means for erasing the designated image data from the memory block, and control means for causing the temporarily evacuated image data to restore in an emptied memory position.

Also, an image data processing device of the present invention comprises first memory means having a plurality of memory blocks for storing image data, designation means for designating an image data to be erased, evacuation means for temporarily evacuating image data other than the designated image data from a sharing memory block in which at least a part of the designated image data is stored, erasure means for erasing the designated image data from the memory block, and control means for causing the temporarily evacuated image data and a new image data to restore in an emptied memory position.

According to the present invention, an image data to be erased is designated by the designation means. Form a sharing memory block in which at least a part of the designated image data and a part of another image data are commonly stored, the part of the not-designated image data is temporarily evacuated. The designated image data is erased. Thereafter, the temporarily evacuated image data is restored in an emptied memory position. Alternatively, the temporarily evacuated image data is restored in an emptied memory position and a new image data is further stored in an emptied memory position. Accordingly, the image data processing device makes it possible to erase image data which are stored with portions of different image data being sharingly stored in common blocks by a unit of one picture.

These and other objects features and advantages of the present invention will become more apparent upon a reading of the following detailed description and accompanying drawings.

BRIEF DESCRIPTION OF THE DRAWINGS

FIGS. 6 to 11 are diagrams showing positional relationships between memory blocks of an image memory and stored image data.

DETAILED DESCRIPTION OF PREFERRED EMBODIMENTS OF THE INVENTION

An electronic still camera embodying the present invention will be described with reference to the drawings. In this camera, a photographic field of view is divided into a plurality of zones. The distance to a subject falling in each of the zones is compared with a currently set distance of the camera to discriminate a main subject zone the subject of which is away from the camera at a distance most identical with the set distance of the camera.

Figures 1A, 1B:
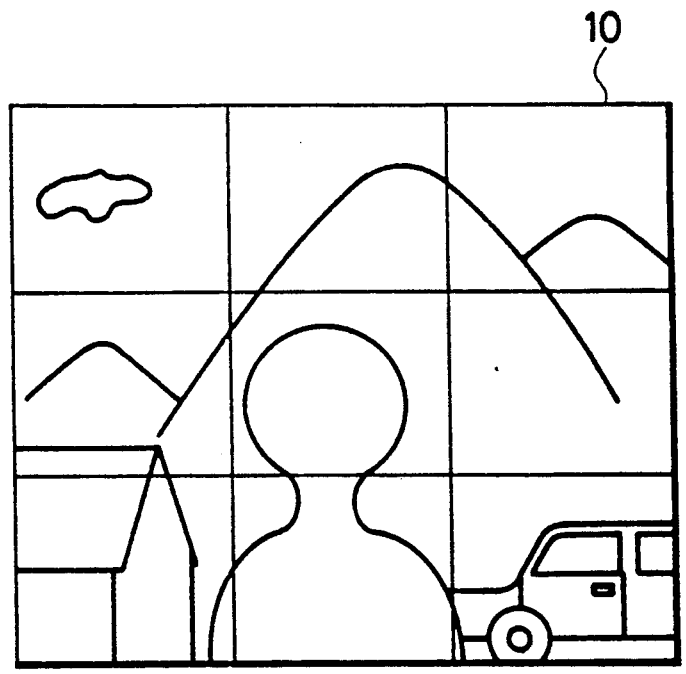
FIG. 1A is a diagram showing a photographic field of view in an electronic still camera embodying the present invention, an photographic field of view of the electronic still camera being into nine zones.
FIG. 1B is a diagram showing a relationship between subject distances of the divided nine zones and compression ratios in the embodiment.

FIG. 1A diagramatically shows subjects falling in divided zones of a photographic field of view 10. FIG. 1B diagramatically shows a relationship between distances to the respective subjects and compression ratios. In this embodiment, the photographic field of view 10 is divided into nine zones which have the same area. It is assumed that photography is practiced under the following conditions. The distance to the subject falling in each zone is: 1 meter in the center zone and the bottom center zone; 3 meters in the bottom right zone; 5 meters in the bottom left zone; and infinity in the other zones. The taking lens of the camera is set in a distance of 1 meter. In other words, the taking lens of the camera is focussed to the subject which is 1 meter away from the camera. Respective compression ratios for the zones is: 5/10 for the center zone and the bottom center zone; 3/10 for the bottom right zone; 2/10 for the bottom left zone; and 1/10 for the other zones. In these conditions, the amount of bits necessary for the entire photographic field of view can be reduced to about one fifth of the amount of bits necessary for not-compressed image data.

Figure 2:
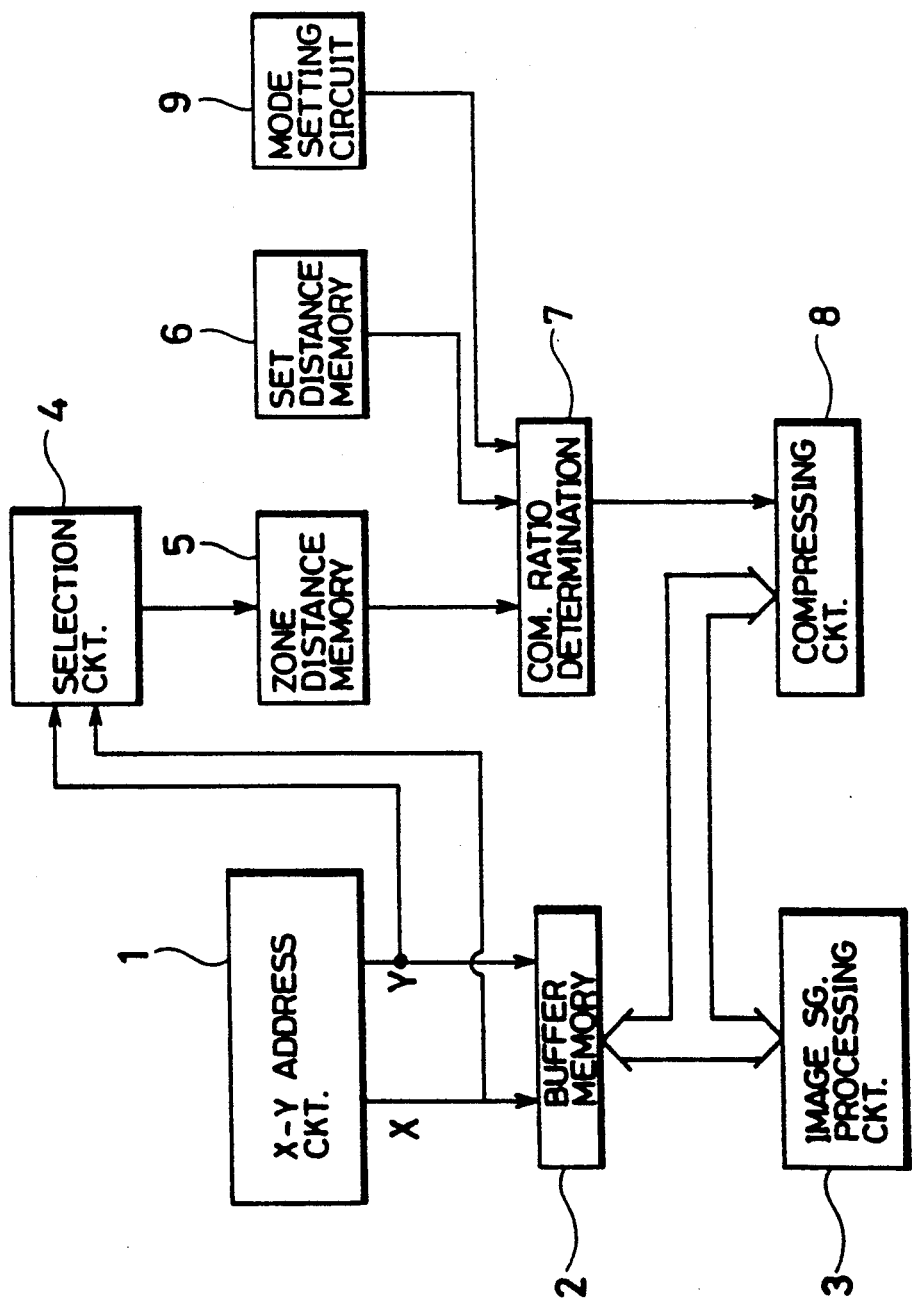
FIG. 2 is a block diagram showing a circuit for changing and setting compression ratio.

FIG. 2 is a block diagram showing a circuit for changing and setting the compression ratio. The circuit includes a X-Y address generator circuit 1, a buffer memory 2, a digital image signal processing circuit 3, a zone selection circuit 4, a zone distance memory 5, a set distance memory 6, a compression ratio determination circuit 7, and a compression circuit 8. The zone distance memory 5 is adopted for storing a measured distance to a subject matter falling in each zone. The set distance memory 6 is adopted for storing a currently set distance of the taking lens of the camera.

Photographed image data stored in the buffer memory 2 is compressed in the following way. The zone selection circuit 4 selects a zone in accordance with an address signal from the X-Y address generator circuit 1. Subsequently, the distance to the subject in the selected zone and the currently set distance of the taking lens are sent in the compression ratio determination circuit 7 to determine a compression ratio for the selected zone which is in turn sent to the compression circuit 8. The compression circuit 8 compresses the photographed image data at the determined compression ratio. In the compression ratio determination circuit 7, the larger the difference between the distance to the subject in the zone and the currently set distance of the taking lens is, the larger the compression ratio is determined to have.

The buffer memory 2 is a frame memory for storing digital image data which is produced by A/D (analog to digital)-converting an analog signal from a CCD image sensor 34 provided in the camera. The buffer memory 2 is connected to the digital image signal processing circuit 3 by a way of data bus line. Specifically, an analog output of the CCD image sensor 34 is converted into a digital signal which is in turn stored in the buffer memory 2 as digital image data. Further, the stored image data is sent to the digital image signal processing circuit 3 in which color separation, matrix processing, white balance correction, and other processings are performed to produce Y, R-Y, B-Y signals, and the like. These signals are sent back to the buffer memory 2 and stored therein. These processed signals are compressed by the compression circuit 8.

The compression is, for example, performed in a two-dimensional discrete cosign transformation (DCT). In this transformation, the compression ratio is changed, in a two-dimensional frequency domain, by decreasing the number of bits allocated to the level of high frequency components of the image signal, or by increasing or decreasing the amount of high frequency components of the image signal to be deleted. By the former manner, a signal-to-noise ratio is reduced. By the latter manner, an image is reproduced at a low resolution.

In this embodiment, however, the image data is compressed by reducing the number of bits for high frequency components in the out-of-focus zones which originally have little high frequency components greater than those in the in-focus zone. Accordingly, it could be seen that image data can be compressed as a whole at a higher ratio without deteriorating the image quality.

Figure 3:
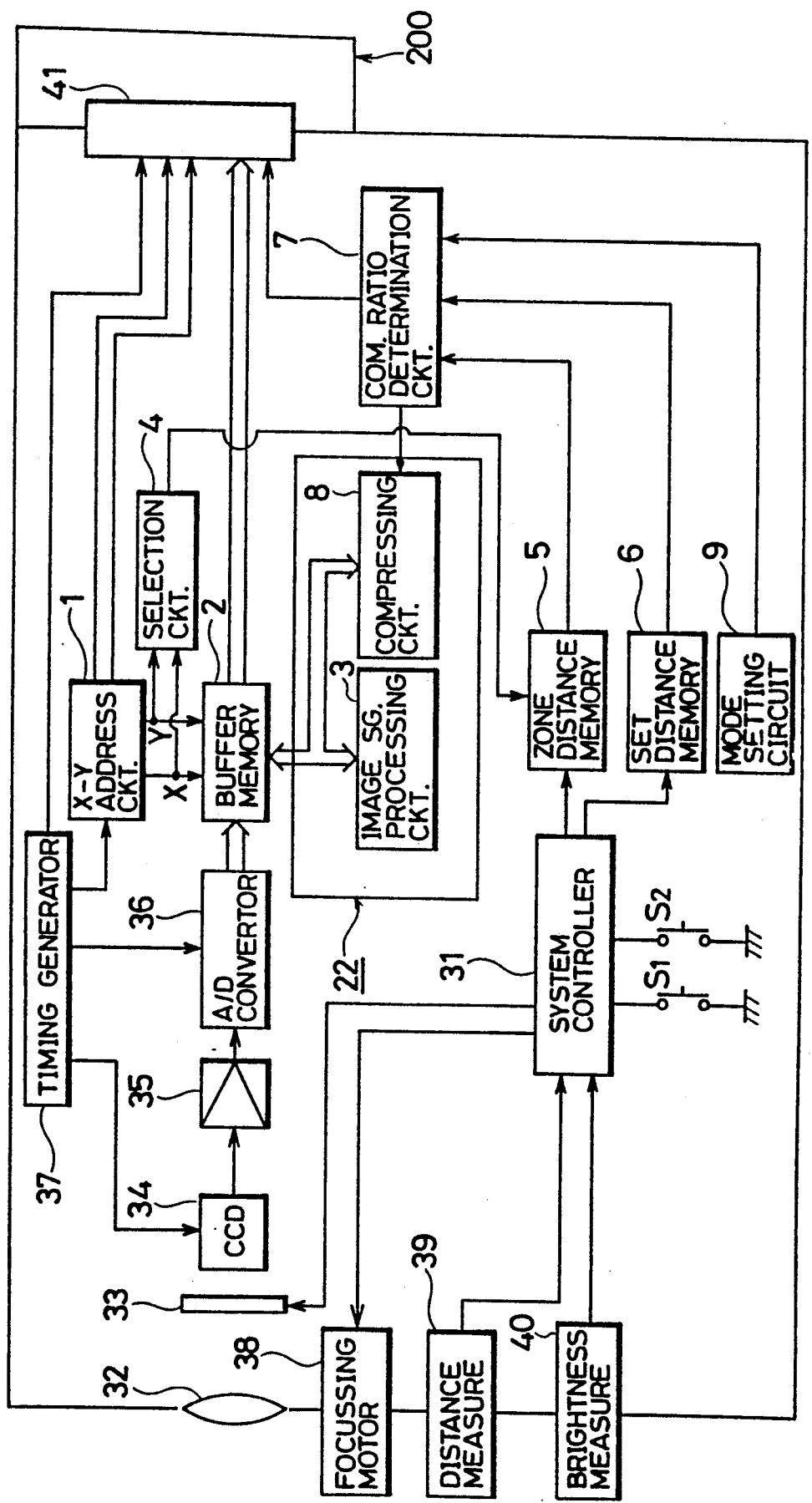
FIG. 3 is a schematic diagram showing a construction of the electronic still camera.

More detailed description will be made with reference to FIG. 3 showing an overall construction of the electronic still camera (or still video camera).

When the photographer presses a release button (not shown) of the camera halfway, a switch S1 is turned on. A system controller 31 receives distance information about a subject falling in each of the zones from zone distance measuring device 39. In this embodiment, the subject distance of the center zone is used as a distance for lens focussing. The system controlled 31 sends a control signal to a focussing lens drive motor 38.

The release button is further pressed to turn on a switch S2. The system controller 31 receives brightness information from a light measuring device 40 to calculate an exposure value, and then determines a shutter speed based on the calculated exposure value. A shutter 33 is driven in accordance with the determined shutter speed.

The image pick-up device 34 including a CCD is exposed for a predetermined period of time to charge photoelectrically converted electrical energy. This charged energy is transferred to an amplifier 35 in accordance with a clock signal from a timing generator 37. The transferred electrical energy is amplified in the amplifier 35, and converted into a digital signal by an A/D converter 36. The digital signal is stored in the buffer memory 2. The digital signal is sent to a signal processing circuit 22 including the digital image signal processing circuit 3 and the compression circuit 8. In the digital image signal processing circuit 3, the color separation, gamma correction, white balance processing, and matrix processing are performed to produce Y, R-Y, and B-Y signals. These processed signals are sent to the compression circuit 8 and then compressed, and sent to a memory card 200.

Figure 4:
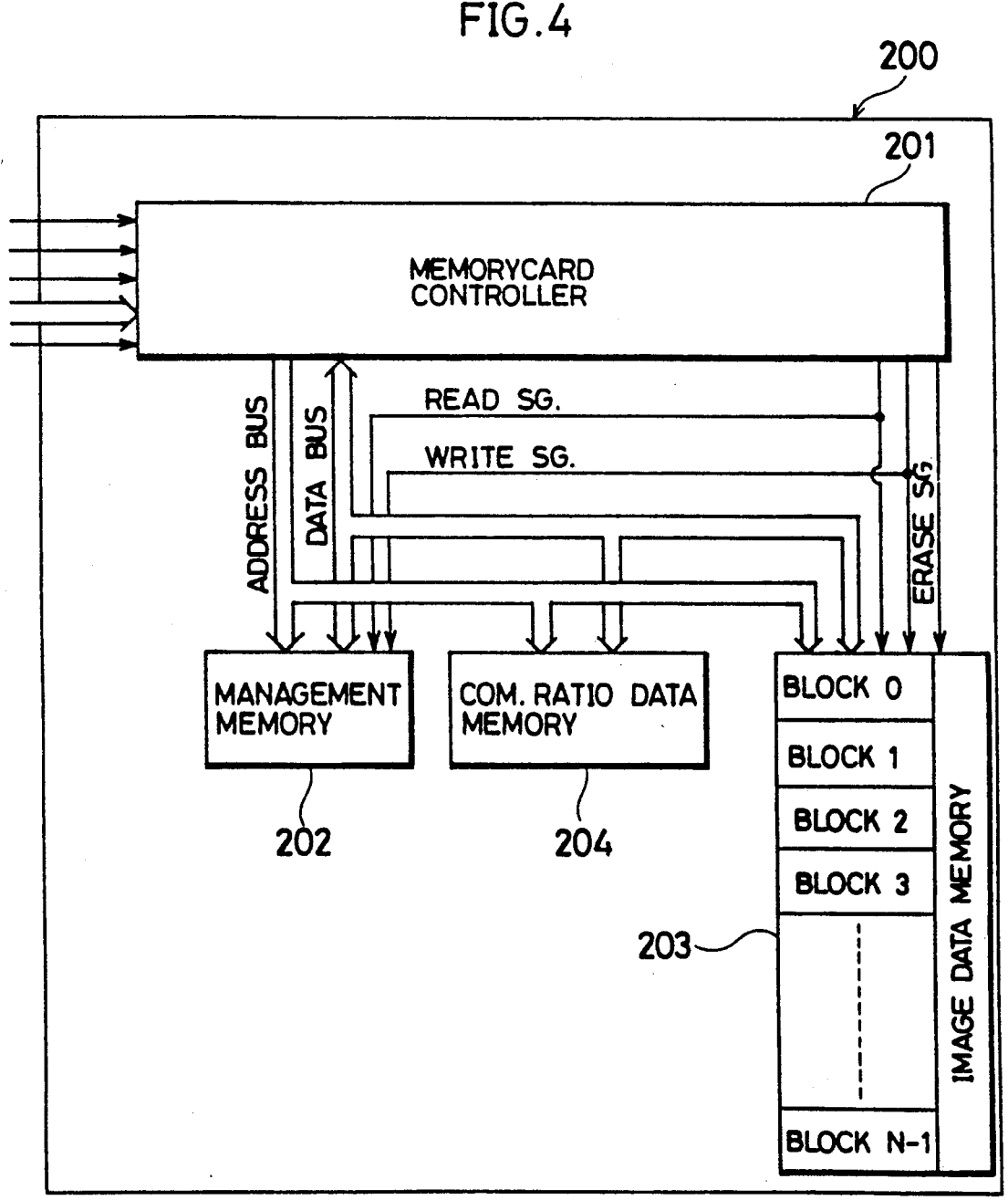
FIG. 4 is a schematic diagram showing a construction of a memory card.

As shown in FIG. 4, the memory card 200 includes a memory card controller 201, an administrative memory 202 for storing administrative data, an image data memory 203 for storing image data, and a compression ratio data memory 204 for storing compression ratios. The memory controller 201 controls writing, reading and erasing of administrative data, image data, and compression ratios and zone information in and from the administrative memory 202, the image data memory 203, and the compression ratio data memory 204 respectively. The administrative memory 202 is adopted for storing administrative data concerning block numbers of a memory area where image data is stored, a start address and an end address of the stored image data, and other administrative information. The image data memory 203 includes a EEPROM for storing image data. The image data memory 203 has Block 0 to Block N−1, that is N blocks. Image data stored in the image data memory 203 can be erased by one block.

The memory card 200 is connected to the camera by a connector 41. The processed signals (image data) which had been processed in the digital processing circuit 22 is transferred and stored in the image data memory 203 through the connector 41. Also, simultaneously, the compression ratio for each zone is stored in the compression ratio data memory 204.

Figure 5:
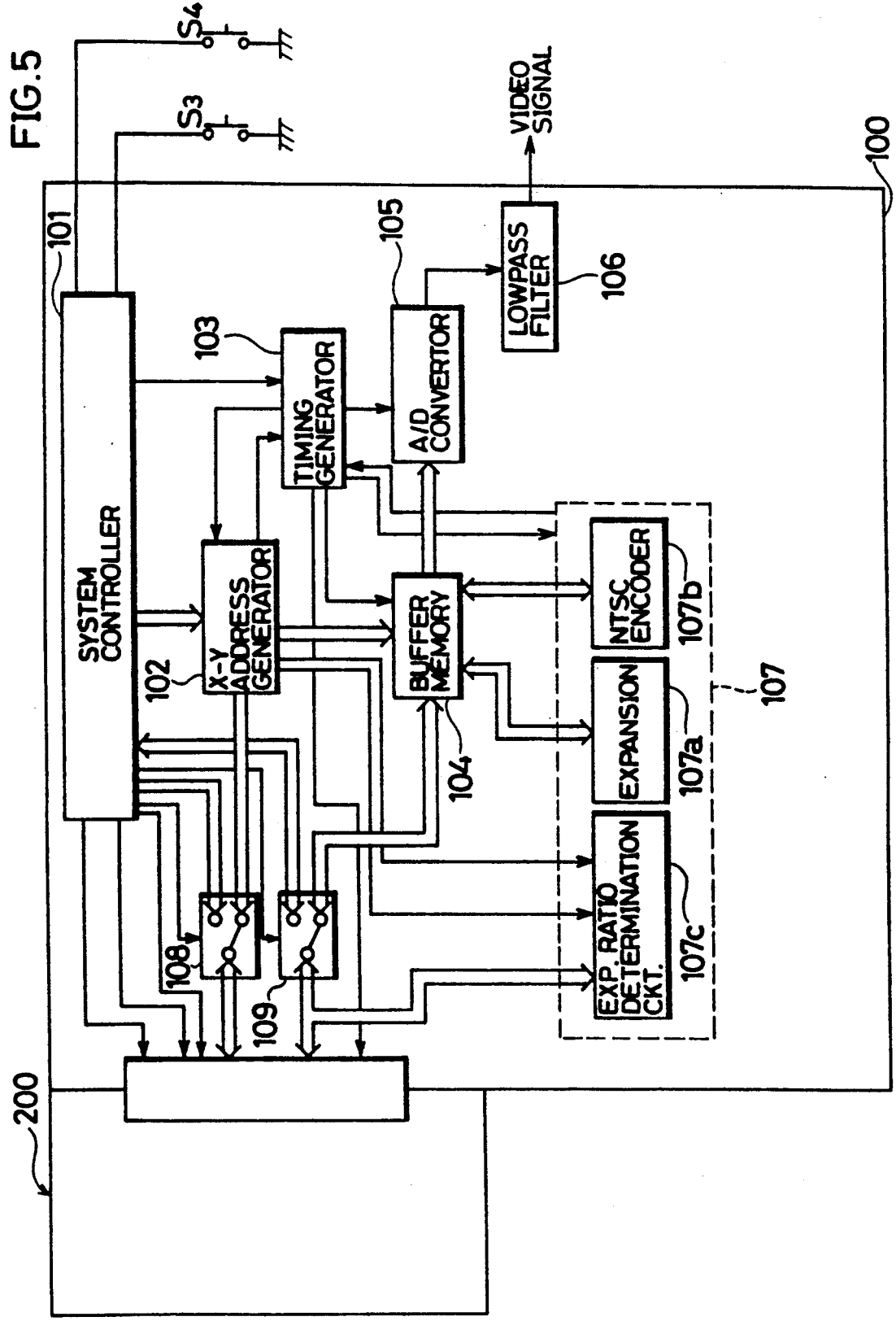
FIG. 5 is a schematic diagram showing a construction of a reproduction/erasure device embodying the present invention.

Next, reproduction and erasure of image data stored in the memory card 200 will be described with reference to FIG. 5 showing an overall construction of an image reproduction/erasure device 100 embodying the present invention. The reproduction/erasure device 100 is connectable with the memory card 200, and can reproduce and erase image data stored in the memory card 200.

The image reproduction/erasure device 100 includes a system controller 101, a X-Y address generator 102, a timing generator 103, a buffer memory 104, a D/A (digital to analog) converter 105, a low pass filter 106, a digital processing circuit 107, a switch 108 for switching an address bus line, and a switch 109 for switching a data bus line.

The system controller 101 is adopted for controlling both reading of image data from the memory card 200 to produce an image signal for reproduction and erasing of image data from the memory card 200. The X-Y address generator 102 is adopted for generating administrative data concerning a start address and an end address of a memory area where an image data is stored, and block numbers of the memory area to read and write the image data in and from the memory card 200. Start addresses, end addresses, and block numbers are set in the X-Y address generator 102 by the system controller 101 when image data is reproduced.

The timing generator 103 is adopted for generating a clock signal to control timing of respective operations of the address generator 102, the buffer memory 104, the D/A converter 105, and the digital processing circuit 107, and the memory card controller 201.

The buffer memory 104 is adopted for temporarily storing image data read from the memory card 200, and image data for reproduction which has been processed in the digital processing circuit 107 as described later.

The D/A converter 105 is adopted for converting image data for reproduction in the form of a digital signal from the buffer memory 104 to an analog signal. The low pass filter 106 is adopted for obtaining converted analog image data (video signal) having a limited band of frequencies.

The digital processing circuit 107 includes an expansion ratio determination circuit 107c, an expansion circuit 107a, and a NTSC encoder circuit 107b. Compressed image data which has been read from the memory card 200 is expanded in the expansion circuit 107a in accordance with an expansion ratio to obtain the original image data. The expansion ratio has been determined in the expansion ratio determination circuit 107c. Thereafter, the restored image data is sent to the NTSC encoder circuit 107b in which NTSC encoding is practiced to obtain a digital video signal for reproduction.

The address bus line switch 108 is adopted for switchably connecting the memory card controller 201 to one of the system controller 101 and the X-Y address generator 102. Also, the data bus line switch 109 is adopted for switchably connecting the memory card controller 201 to one of the system controller 101 and the buffer memory 104.

A switch S3 is adopted for advancing reproduced still images. A switch S4 is adopted for erasing an image data. For example, these switches S3, S4 are provided in an operation panel (not shown) of the main body of the camera. Each time the switch S3 is pressed, still images are reproduced one after another in such a manner as described later.

Figure 6:
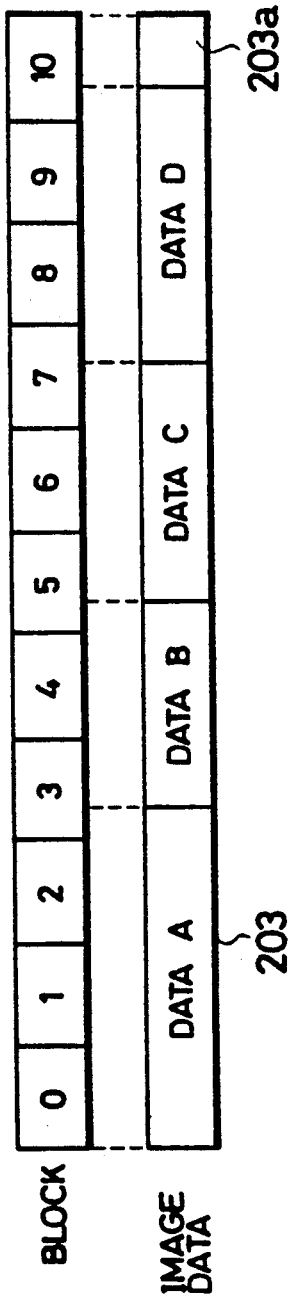

As shown FIG. 6, image data are sequentially stored one immediately after another regardless of a block order. In FIG. 6, Block 0 through Block 10 make up a memory area corresponding to an entire storage capacity of the image memory 203. In this embodiment, the image memory 203 has eleven blocks. Also, Image data A, B, C, and D represent image data for four still pictures stored in the memory area of the image memory 203. Indicated at 203a is a not-used memory area.

The four image data have different compression ratios. Consequently, the respective data amounts of the four image differ from one another. Also, the data amount of each image data is not usually a multiple of the storage capacity of one block. Accordingly, portions of two adjoining image data are likely to be stored in a common block as shown in FIG. 6. For example, image data A is stored in Blocks 0 to 3. Image data B is stored in Blocks 3 to 5. The rear portion of Image data A and the front portion of Image data B are both stored in Block 3.

Next, operation of the reproduction/erasure device 100 will be described. First, it will be reproducing of image data stored in the memory card 200. When the user turns on the switch S3, the switches 108 and 109 are put into the states of connecting the system controller 101 to the memory card controller 201 by ways of the address bus line and the data bus line. Thereafter, the system controller 101 reads out administrative data regarding image data to be reproduced from the administrative data memory 202 via the memory card controller 201. The read administrative data concerning block number, start address, and end address of the image data to be reproduced are set in the address generator 102.

Next, the switches 108 and 109 are put into the other states of connecting the memory card controller 201 to the buffer memory 104 and the timing generator 103 by ways of the address bus line and the data bus line respectively. Then, the system controller 101 sends a start signal for data transfer to the timing generator 103. Upon receiving the start signal from the system controller 101, the timing generator 103 sends specified clock signals for data transfer to the buffer memory 104 and the memory card controller 201.

Subsequently, the system controller 101 sends a control signal for reading image data to the memory card controller 201. Upon receiving the control signal from the system controller 101, the memory card controller 201 reads the specified image data based on the block number and the addresses from the start address to the end address sent from the X-Y address generator 102. Then, the read image data is transferred to the buffer memory 104. Upon the end address being sent, the reading of the specified image data to be reproduced is completed, and an end signal for data transfer is sent from the X-Y address generator 102 to the timing generator 103.

Upon receiving the end signal for data transfer, the timing generator 103 stops sending the clock signal for data transfer to the memory card controller 201 to stop the transferring of image data from the memory card controller 201 to the buffer memory 104.

Next, the timing generator 103 sends a transfer clock signal, a control clock signal, and a processing clock signal to the X-Y address generator 102, the digital processing circuit 107, and the buffer memory 104 respectively. The X-Y address generator 102 generates a transfer address based on the transfer clock signal from the timing generator 103. Then, the X-Y address generator 102 sends the transfer address to the buffer memory 104.

The image data temporarily stored in the buffer memory 104 is transferred in accordance with the transfer address and the control clock signal to the expansion circuit 107a of the digital processing circuit 107 in which the compressed image data is expanded at an expansion ratio in the expansion circuit 107a in accordance with the processing signal. In other words, the compressed image signal is expanded by practicing two-dimensional reverse discrete cosign transformation every zone in accordance with the signal from the X-Y address generator 102 and the information from the compression ratio data memory 204 in the memory card 200.

Further, the expanded signal is sent to the NTSC encoder circuit 107b where NTSC encoding is practiced to generate a NTSC signal for TV display. Then, the NTSC encoded signal is sent to the buffer memory 104 again and stored in a specified memory area of the buffer memory 104. The NTSC encoding is specifically practiced in the following way. Among the Y signal, R-Y signal, and B-Y signal of the expanded signal, the R-Y, B-Y signals are balanced-modulated on to a chrominance subcarrier, on to which the Y signal is added to produce a new signal. A burst signal, a horizontal synchronization signal, and a vertical synchronization signal are added to the new signal to produce the NTSC signal.

When the image data processing for one picture is completed, the digital processing circuit 107 sends an end signal for signal processing to the timing generator 103. Upon receiving the end signal from the digital processing circuit 107, the timing generator 103 sends the transfer clock signal, the control clock signal, and a clock signal for D/A conversion to the X-Y address generator 102, the buffer memory 104, and the D/A converter 105 respectively. The image data stored in the buffer memory 104 is transferred to the D/A converter 105 based on the transfer address sent from the X-Y address generator 102 and the control clock sent from the timing generator 103. After D/A converted in the D/A converter 105, the video signal is limited to a specified band in the low pass filter 106, and sent to a display device (not illustrated.)

The above sequence of operations are repeated each time the switch S3 is pressed on so that stored images are sequentially reproduced on the display screen.

Next, erasure operation for erasing image data from the memory card 200 will be described. In the case of erasing Image data B from the image memory 203 shown in FIG. 6, for example, the following operations will be practiced.

Figure 7:
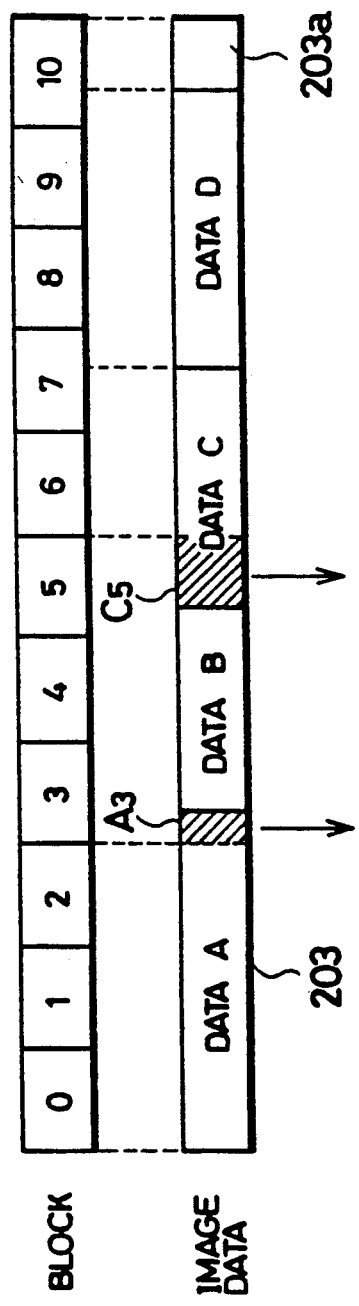

First, Blocks 3 to 5 in which Image data B is stored are detected from all the blocks of the image memory 203. The detected Blocks 3 to 5 are deemed to be erasing blocks. Next, a rear portion $A_3$ of Image data A which is stored in Block 3 is temporarily transferred to the buffer memory 104 for evacuation as shown in FIGS. 7 and 8. Subsequently, image data stored in Blocks 3 and 4 is erased. Thereafter, the rear portion $A_3$ of Image data A is again stored in the previous address of Block 3.

Next, a front portion $C_5$ of Image data C is temporarily transferred to the buffer memory 104 for evacuation. The remaining image data stored in Block 5 is then erased. Thereafter, the front portion $C_5$ of Image data C is again stored in the previous address of Block 5.

FIG. 9 shows a state of the image memory 203 in which Image data B is erased by this erasing operation. After Image data B is erased, the memory area where Image data B had been stored is not occupied by any data as shown in FIG. 9. The other Image data A, C, and D are not influenced by this erasuring operation.

Next, this erasing operation will be described with reference to FIG. 5 showing the overall construction of the reproduction/erasure device 100.

If the switch S4 is turned on in the state that Image data B is reproduced on the display screen, the switches 108 and 109 is changed to the states that the system controller 101 is connected to the memory card controller 201 by ways of the address bus line and data bus line. The system controller 101 discriminates based on the block number from the administrative memory 202 which blocks are used by Image data B being currently reproduced on the display screen. The discriminated blocks are determined as erasing blocks. Subsequently, the system controller discriminates which blocks are used by the adjoining Image data A and C. Further, the system controller discriminates which blocks are commonly used by Image data B and Image data A or C.

In FIG. 6, the following shows the blocks in which Image data A, B, and C are stored and the numbers of blocks which are shared by Image data B and Image data A or C.

Image Data A: Blocks 0 to 3
Image Data B: Blocks 3 to 5
Image Data C: Blocks 5 to 7
Shared blocks: Blocks 3 and 5

Subsequently, the system controller 101 finds out the start address of Block 3 and the end address of Image data A in Block 3. These address are then set in the X-Y address generator 102 by the system controller 101.

Next, the switches 108 and 109 are changed to the states that the memory card controller 201 is connected to the X-Y address generator 102 and the buffer memory 104 by the ways of the address bus line and the data bus line respectively, and then sends the start signal for data transfer to the timing generator 103. Upon receiving the start signal for data transfer, the timing generator 103 sends the address for data transfer, the transfer clock signal to the X-Y address generator 102, the buffer memory 104, and the memory card controller 201 respectively. Subsequently, the system controller 101 sends the read-out control signal to the memory card controller 201.

Upon receiving the read-out control signal from the system controller 101, the memory card controller 201 reads out the rear portion $A_3$ of Image data A stored in Block 3 based on the block number (i.e.; Block 3), the start address, and the end address sent from the X-Y address generator 102, and transfers the rear portion $A_3$ of Image data A to the memory area in the buffer memory 104, which is also used for reproducing image data.

Immediately after the image data stored in the end address is transferred to the X-Y address generator 102, the X-Y address generator 102 sends the end signal for data transfer to the timing generator 103. Upon receiving the end signal, the timing generator 103 stops sending the clock signal for data transfer to the memory card controller 201. The memory card controller 201, in turn, stops transferring the rear portion $A_3$ of Image data A to the buffer memory 104.

Subsequently, the system controller 101 sends a command signal for erasing the image data in Blocks 3 and 4 to the memory card controller 201a. Consequently, the system controller 101 sets in the X-Y address generator 102 the start address of Block 3 and the end address of the rear portion $A_3$ of Image data A. Simultaneously, the system controller 101 sends a start signal for data transfer and a write-in control signal to the timing generator 103 and the memory card controller 201 respectively.

Upon receiving the write-in control signal, the memory card controller 201 sends the write-in signal to the image memory 203. Then, the rear portion $A_3$ of Image data A transferred from the buffer memory 104 is stored in the previous address in Block 3 of the image memory 203.

The front portion $C_5$ of Image data C stored in Block 5 is again stored in the original address in Block 5 in the same way as the rear portion $A_3$ of Image data A. In other words, the front portion $C_5$ of Image data C is transferred to the buffer memory 104 and temporarily stored therein. After the image data stored in Block 5 is erased, the front portion $C_5$ of Image data C is transferred back to Block 5 and again stored in the previous address in Block 5.

In the above case, the portions $A_3$ and $C_5$ of Image data A and C are separately transferred to the buffer memory 104 for temporary evacuation, thus requiring the similar operations to be repeated twice. Alternatively, the portions $A_3$ and $C_5$ of Image data A and C may be stored in the buffer memory 104 for temporary evacuation at the same time. In this case, the portions $A_3$ and $C_5$ of Image data A and C are again stored in the previous addresses in Blocks 3 and 5 respectively after the image data stored in Blocks 3 to 5 is erased.

Figure 10:
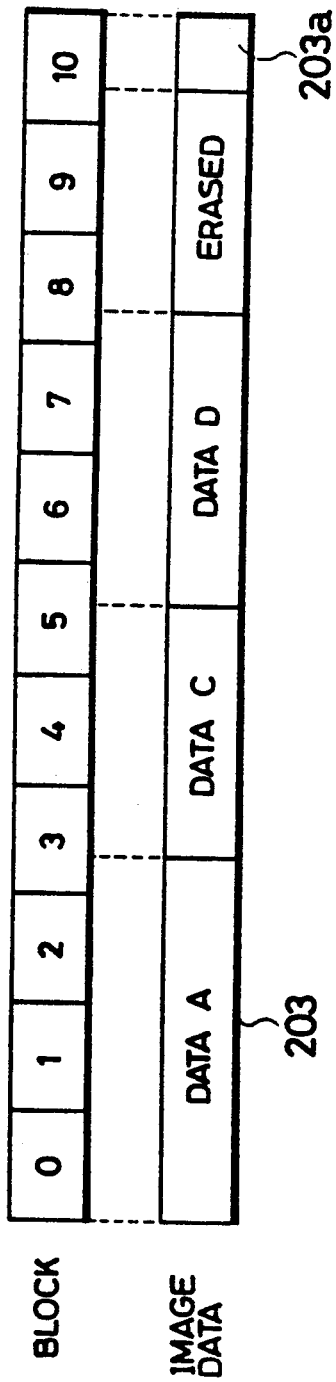
Figure 11:
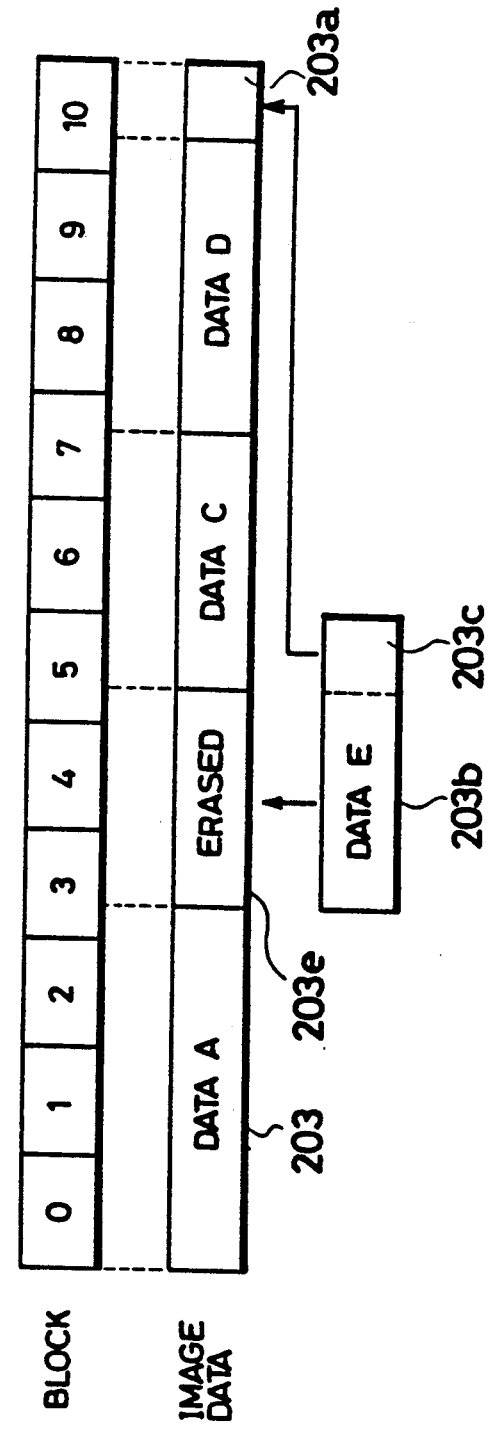

Also, Image data C and D may be moved to the emptied area 203e which has been produced by erasing Image data B as shown in FIG. 10. In this case, the front portion $C_5$ of Image data C which is stored in the buffer memory 104 for temporary evacuation is stored from the address immediately after the end address of Image data A after the image data stored in Block 5 is erased. Subsequently, the rear portion of Image data C and the Image data D stored in Blocks 6 to 10 are moved to addresses succeeding to the end address of the front portion $C_5$ of the image data C.

Also, a new image data, i.e., Image data E, can be stored in the emptied area 203e of the image memory 203. If the emptied area 203e of the image memory 203 is not large enough to store the new image data, the new image data is divided into a front data portion 203b to be stored in the emptied area 203e and a rear data portion 203c to be stored in another emptied area 203a. In this case, the start address, end address, block number of each of the divided data portions 203b, 203c are written in the administrative memory 202. In this case, it could be seen to be unnecessary that each time image data is erased, the image data following the erased image data is moved forward so as to fill the emptied portion.

According to the present invention, other solid-state memories than EEPROM may be used for the image memory on condition that image data can be erased by one block.

In the above-mentioned embodiment, the buffer memory 104 is used not only for the expansion of image data and the generation of video signal but also for the temporary evacuation of image data not to be erased. However, according to the present invention, a separate buffer memory may be provided for temporary evacuation. In this case, it is preferable that the buffer memory for temporary evacuation have the same storage capacity as one block of the image memory. Also, it is preferable to provide the buffer memory for temporary evacuation in the memory card 200. The provision of the buffer memory in the memory card 200 can make the main body of the camera compact, and can ensure rapid transfer of image data for temporary evacuation.

It should be noted that the above-mentioned embodiment is described as example. According to the present invention, other signal processings and signal forms may be used. For example, an output from an image pick-up device is immediately converted into a digital signal and compressed. Into a memory card is then stored the compressed digital signal. In this case, such signal processing as color separation, gamma correction, white balance correction, matrix processing, and NTSC encoding is practiced when reproducing image data.

Also, an output from an image pick-up device, which is in the form of an analog signal, may be firstly processed in color separation, gamma correction, white balance correction, matrix processing, and NTSC encoding to produce a NTSC signal. The NTSC signal may be converted into a digital signal and then stored in a memory card.

As signal compression, also, may be employed a differential pulse-code modulation and a vector quantization.

In the above-mentioned embodiment, a photographic field of view is divided into nine zones. According to the present invention, however, the number of divided zones are not limited in nine. A photographic field of view may be divided into a desired number of zones. Alternatively, it may be possible to provide a device enabling a photographer to freely set his desired number of zones.

Also, it may be preferable to provide a mode setting circuit 9 as shown in FIGS. 2 and 3 which allows a photographer to select a desired one of several compression modes. For example, in the compression mode, there is provided a portrait mode in which the compression ratio of each zone is automatically set. Specifically, with reference to FIG. 1, when the portrait mode is selected, the compression ratio of the center zone and center bottom zone are automatically set to a lower value or zero, and the compression ratio of the other zones are automatically set to a higher value. It could be seen that this portrait mode can produce an effect similar to that of a photographic manner of photographing in a full-opened aperture and a shallow depth of field. In other words, the picture can be obtained in which a main subject is clearly reproduced while the background is blurrily reproduced. Such a picture is preferable for a portrait since the main subject stands out of the background. In this case, a subject in the center zone is determined to be a main subject. Also, there may be another determination of a main subject in which a nearest subject is found out from subject distances of zones and determined to be a main subject.

Further, in the above-mentioned embodiment, respective subject distances of divided zones and compression ratios are placed in a fixed relationship in which the compression ratio is changed stepwise in accordance with a range of subject distances. For example, in FIG. 1B, a distance range of 1 meter is alloted a compression ratio of 5/10, a distance range of 2 meters to 3 meters being alloted a compression ratio of 3/10, a distance range of 4 meters to 5 meters being alloted a compression ratio of 2/10, a distance range of more than 5 meters being alloted a compression ratio of 1/10. However, the amount of high frequency component of subject has been seen to continuously vary with change of subject distance. Accordingly, the compression ratio is changed by reducing the high frequency component amount in accordance with change of subject distance so as to continuously change the compression ratio.

Moreover, in the above-mentioned embodiment, it is first practiced measuring of distances to respective subjects falling in divided zones of a photographic field of view. Thereafter, the subject is discriminated which is away from the camera at a distance closest to an already-set distance of the taking lens, and then considered to be a main subject. However, the present invention can be applied to an autofocus camera. In an autofocus camera, focussing is made to a subject falling in an autofocus zone of the photographic field of view of the autofocus camera. Accordingly, the subject which falls in the autofocus zone may be considered to be a main subject, and an appropriate compression ratio is then determined.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image data processing device comprising:
   first memory means having a plurality of memory blocks for storing image data;
   designation means for designating an image data to be erased;
   evacuation means for temporarily evacuating image data other than the designated image data from a sharing memory block in which at least a part of the designated image data is stored;
   erasure means for erasing the designated image data from the memory block; and
   control means for causing the temporarily evacuated image data to be stored in an emptied memory position.

2. An image data processing device according to claim 1 wherein the first memory means includes an EEPROM.

3. An image data processing device according to claim 1 wherein the first memory means is removably mounted in the image data processing device.

4. An image data processing device according to claim 1 wherein the evacuation means includes:
   removal means for removing image data other than the designated image data from a sharing memory block in which at least a part of the designated image data is stored; and
   second memory means for storing the removed image data.

5. An image data processing device according to claim 4 wherein the first memory means and the second memory means are made of separate memory elements respectively.

6. An image data processing device according to claim 4 further comprising reproduction means for reproducing stored image data, the second memory means being a buffer memory for storing image data for reproduction.

7. An image data processing device according to claim 4 wherein the first memory means and the second memory means have the same storage capacity.

8. An image data processing device comprising:
   first memory means having a plurality of memory blocks for storing image data;
   designation means for designating an image data to be erased;
   evacuation means for temporarily evacuating image data other than the designated image data from a sharing memory block in which at least a part of the designated image data is stored;
   erasure means for erasing the designated image data from the memory block; and
   control means for causing the temporarily evacuated image data and a new image data to be stored in an emptied memory position.

9. An image data processing device according to claim 8 wherein the first memory means includes an EEPROM.

10. An image data processing device according to claim 8 wherein the first memory means is removably mounted in the image data processing device.

11. An image data processing device according to claim 8 wherein the evacuation means includes:
   removal means for removing image data other than the designated image data from a sharing memory block in which at least a part of the designated image data is stored; and
   second memory means for storing the removed image data.

12. An image data processing device according to claim 11 wherein the first memory means and the second memory means are made of separate memory elements respectively.

13. An image data processing device according to claim 11 further comprising reproduction means for reproducing stored image data, the second memory means being a buffer memory for storing image data for reproduction.

14. An image data processing device according to claim 11 wherein the first memory means and the second memory means have the same storage capacity.

15. An image data processing device according to claim 8 wherein the control means causes the temporarily evacuated image data to be stored in the memory position where the erased image data had been stored.

16. An image data processing device according to claim 8 wherein the control means causes the temporarily evacuated image data to be stored in its original memory position and a new image data to be stored in the memory position where the erased image data had been stored.

17. An image data processing device according to claim 16 wherein the control means causes a new image data to be divided into a portion to be stored in the memory position where the erased image data had been stored and a portion to be stored in another memory position, when the new image data is greater than the storage capacity of the memory position where the erased image data had been stored.

18. An image data processing device comprising:
   first memory means having a plurality of memory blocks for storing image data;
   designation means for designating an image data to be erased;
   evacuation means for temporarily evacuating image data other than the designated image data from a sharing memory block in which at least a part of the designated image data is stored; and
   erasure means for erasing the designated image data from the memory block.

19. An image data processing device according to claim 18 wherein the first memory means includes an EEPROM.

20. An image data processing device according to claim 18 wherein the first memory means is removably mounted in the image data processing device.

21. An image data processing device according to claim 18 wherein the evacuation means includes:
   removal means for removing image data other than the designated image data from a sharing memory block in which at least a part of the designated image data is stored; and
   second memory means for storing the removed image data.

22. An image data processing device according to claim 21 wherein the first memory means and the second memory means are made of separate memory elements respectively.

23. An image data processing device according to claim 21 further comprising reproduction means for reproducing stored image data, the second memory means being a buffer memory for storing image data for reproduction.

24. An image data processing device according to claim 21 wherein the first memory means and the second memory means have the same storage capacity.

* * * * *